United States Patent Office 3,249,566
Patented May 3, 1966

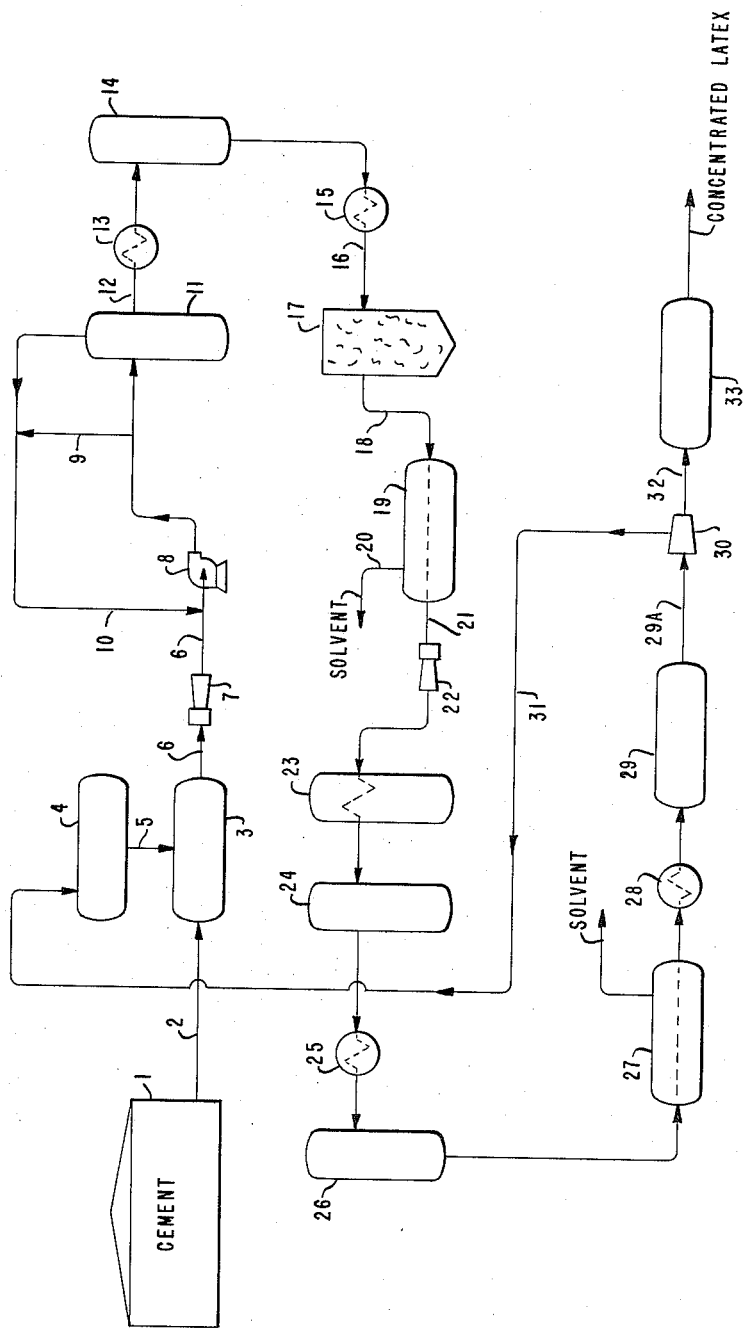

3,249,566
COLLAPSING OF DIENE LATEX CEMENT FOAM
Nathan C. May, Berkeley, Calif., assignor to Shell Oil Company, New York, N.Y., a corporation of Delaware
Filed Sept. 10, 1962, Ser. No. 222,406
3 Claims. (Cl. 260—23.7)

This invention relates to the process for producing latices of synthetic polymers. More particularly, it relates to improved processes for producing latices of polymers (elastomers) from organic solvent solutions thereof.

The art and technology relating to latices of synthetic polymers is highly developed. In the prior art, synthetic elastomers and other polymers are commonly prepared by emulsion polymerization techniques whereby the resulting product at the end of the polymerization is a suspension wherein the solids content varies depending upon the particular art and technology involved. Thus, for example, synthetic elastomers of the type represented by styrene-butadiene copolymers are suitably prepared by emulsion polymerization in the presence of water and emulsifying agents so that the resulting product is an aqueous suspension of the copolymer together with the unreacted monomers.

In such emulsion polymerization processes, the copolymer ultimately may be separated upon the addition of precipitants such as salt and acid, whereupon a crumb of the rubber is obtained which is easily separated from the aqueous phase. Synthetic latex, as distinguished from crumb, is highly useful in the production of foam rubber or cellular products. The latex usually is obtained from the emulsion by flashing to remove the unreacted monomer and some water, the resulting product being latex.

In many instances, the preparation of latex from particular rubbers by flashing procedures results in great difficulties relative to excessive foaming of the products involved, especially if substantial amounts of solvent or monomer must be removed. The foam appears to be accentuated as the temperature is raised in an effort to flash off hydrocarbon constituents the solvent vapors being intimately mixed with liquid or solid components to such an extent that a froth or foam is formed which has been found to be difficult in many cases to resolve and which clogs vapor recovery apparatus.

In recent years, synthetic elastomers produced by solution polymerization methods have received much attention mainly due to advances and changes in elastomer technology. The problems of emulsifying the cements so produced to make latices therefrom have created difficulties not heretofore experienced. Material differences exist not only within the elastomers per se but in addition the solutions of these elastomers have different rheological properties and characteristics from those of prior products. The presence of large proportions of solvent and the requirement for relatively large proportions of emulsifying agents (compared with the requirements of an emulsion polymerization process) compound the foaming problems.

It would be highly desirable to devise a process for the conversion of synthetic polymer (elastomer) cements into latex form without encountering the difficulties briefly referred to hereinbefore. It would be especially desirable to devise a process which would minimize or eliminate the problems usually connected with undue foaming of the product, and more specifically, to take advantage of the necessity for flashing off the solvent in such a manner as to cause stable foam formation.

Now, in accordance with the present invention, a process for the production of a latex of a synthetic hydrocarbon polymer, preferably an elastomer, comprises mixing water, a cement of the polymer in an organic solvent therefor, said solvent having a maximum boiling point at least 65° C. below that of water, and an emulsifying amount of an emulsifying agent; treating the mixture so formed to create an emulsion, and then subjecting the emulsion so created to vaporize the cement solvent while maintaining most of the water in a liquid state. A critical limitation of the process is the use of a cement solvent having a water solubility of at least about 0.5 cc. per liter and preferably no more than about 5 cc. per liter, both at room temperature. Under these conditions, a foam is formed of substantially all of the products present, namely, substantially all of the organic solvent, water, emulsifying agents and colloidally dispersed polymer particles.

The foam is then treated to reduce the vapors of organic solvent to a liquid state and thereafter the mixture of liquid phases is treated to remove the organic solvent liquid phase containing no more than a minor proportion of its original polymer content and a separate latex phase comprising water, emulsifying agent and colloidally dispersed polymer particles.

The polymer

The process of this invention is applied to an hydrocarbon polymer that is in the form of a cement before being emulsified. It is immaterial how the cement of the polymer is obtained. Preferably, the polymer is a synthetic elastomer and still more preferably a rubbery polymer (including copolymers) of conjugated dienes. The solvent utilized in forming the cement (polymer solution) should have the limited water solubility referred to hereinafter. The preferred classes of solvents comprises those boiling at least 70° C. below the boiling point of water under a given set of conditions, i.e., pressure, and a water solubility of 0.5–5 cc./l. of water at 20° C.

In the more preferred embodiments, the process of the invention is applied to synthetic hydrocarbon elastomers prepared by solution polymerization methods wherein an organic diluent is used as a combined solvent and diluent.

Butadiene and isoprene are representatives of conjugated dienes which are polymerized by solution polymerization utilizing the so-called "low pressure" polymerization methods wherein the polymerization catalyst may be the reaction product of a halide of a transition metal within groups 4–8 of the periodic table and a reducing agent such as an aluminum alkyl, aluminum alkyl halide, aluminum hydride and the like. Lithium alkyls, alone or in combination with lithium metal are also suitable polymerization catalysts for conjugated dienes. Thus, polybutadiene or polyisoprene having a cis 1,4- content as high as about 95% may be obtained while my other methods polymers having a high trans 1,4- content may be prepared if so desired.

Another class of synthetic polymers comprise the copolymers prepared from ethylene and one or more monoolefins having up to 8 carbon atoms and terpolymers having a diene in a minor proportion. Suitable copolymers include especially the copolymers of ethylene and propylene which may be either elastomeric or plastic depending upon the relative proportions of ethylene and propylene and the copolymers of ethylene with butene-1 and the like. Elastomeric terpolymers prepared by solution polymerization are also equally suitable for the purposes of the present invention, such as the terpolymer obtained by the combination of ethylene, propylene and a diene such as 1,5-hexadiene cyclopentadiene, dicyclopentadiene or cycloheptadiene, prepared by polymerization of a mixture of monomers with a catalyst which may be the reaction product of a reducing agent of the kind indicated above and a vanadium compound such as vanadium halides, vanadium oxyhalides, vanadium esters and the like. The usual solvents employed for these polymerizations and suitable for use in present process include hydrocarbons having from 4–5 carbon atoms each including butanes, pentanes, butylenes, and amylenes, and other relatively inactive diluents and solvents known in the art (and their mixtures), as long as the water solubility relationship set out above is maintained.

Persons skilled in the art will understand that these hydrocarbon elastomers comprise those that are of relatively recent origin. The elastomer solutions are characterized by being very high in viscosity even at low elastomeric polymer content. Thus, the solids content of the elastomer solution at the end of the polymerization rarely exceeds 30% by weight and in fact at such concentrations, great material handling problems are presented so that the solutions usually contain in the order of 5–20% by weight of the elastomer.

When the cement is emulsified, the solids content is preferably substantially less than if it is to be processed to form a crumb. The invention, however, is not critically limited to elastomers prepared by the low pressure processes and any hydrocarbon elastomers produced by solution processes may also be the subject of the pressent invention. Alternatively, elastomers that are in solid form or in latex suspension may be dissolved or redissolved after preparation by other means. When used within this specification, the term "synthetic elastomer" makes reference to synthetic elastomers defined according to ASTM special technical publication No. 184, page 138, wherein the elastomer is further characterized in being essentially completely soluble in an organic solvent.

*The emulsification*

The emulsification of the polymer solution comprises bringing together water, an emulsifying agent and the polymer cement. The apparatus which is employed for emulsification should be designed for the purpose of homogenizing such mixtures for the production of emulsions. In this regard, a centrifugal pump with a variable speed control and/or a by-pass is found to be suitable although other homogenizing equipment may be used in place thereof.

It will be found that the maximum throughput rate in a given piece of apparatus may be substantially increased if the concentration of the polymer in the organic solvent is restricted so as to utilize an optimum viscosity which will vary, depending upon the particular apparatus and the particular polymer employed. The viscosity is not only dependent upon the concentration of the polymer in its cement but also upon the average molecular weight of the polymer contained therein. Taking as an example, cis 1,4-polyisoprene solution in an aliphatic diluent such as isopentane or isoamylene, suitable throughput rates are experienced at concentrations in the order of 10–20%, although much faster throughput rates may be experienced if the concentration is maintained in the order of 7–10% by weight, the intrinsic viscosity of the polymer contained in the cement being between about 4 and 14 dl./g.

The amount of emulsifying agents and of water emulsified together with the polymer cement depends on such factors as the particular synthetic elastomer being emulsified or upon the particular nonelastomeric polymer present. The proportion will also vary depending upon the emulsification apparatus, the identity of the emulsifying agent, the concentration of the elastomer solution and other variables including temperature. It should be emphasized that the proportion of emulsifying agent utilized at this point in the process is not necessarily the concentration of emulsifying agent which will remain in the latex eventually produced after the claimed process. Generally, the minimum amount of emulsifying agent needed for emulsification ranges from about 2 to 30 parts per 100 of polymer (phr.), but the amount that is contained in the most preferred concentrated latex is usually lower than the 30 parts specified above and will vary depending upon the particular elastomeric latex that is being prepared. Amounts from about 1 to about 3 phr. usually are optimum.

Any of the emulsifying agents employed in the emulsion polymerization art may be suitably employed for purposes of the present invention. Preferably, the emulsifying agents are soaps and particularly alkali metal soaps of monocarboxylic acids. The sodium or potassium soaps of rosin acids are especially preferred although mixed soaps such as the soaps of tall oil acids, saturated or unsaturated fatty acids such oleic, palmitic, stearic, lauric, myristic, castor oil acids and similar acids may be employed in the preparation of suitable emulsifying soaps.

In addition to, or in place of, the soap emulsifying agents, other emulsifiers may be utilized incuding cationic or non-ionic water-dispersible emulsifiers particularly the amine salts of hydroxyl amines and long chain fatty acids esters as well as quaternary ammonium salts such as tridecyl benzene hydroxy ethyl imidazoline chloride and stearyl dimethyl benzyl ammonium chloride and the like. Non-ionic surfactants which may be utilized for this purpose are represented by phosphoric acid esters of higher alcohols such as capryl and octyl alcohols, monoesters of oleic acid with pentaerythritol, sorbitan monooleate and the like.

The emulsifying agent is preferably added to the mixture being prepared for emulsification in the form of an aqueous solution or dispersion and desirably is in concentrations in the order of 0.5–2% w. based on the eventual aqueous phase of the emulsion. The amount of water contained in the total composition for emulsification will normally range from about 40 to about 300 parts per hundred parts by volume of elastomer solution (cement), with amounts in the order of 50–100 being preferable.

It will be appreciated that the emulsification procedures may be varied within the knowledge of the art. Thus, the emulsifying agent may be prepared in situ by adding the soap forming acid to the elastomer solution and adding an alkali metal hydroxide to the aqueous phase. The reaction of the alkali metal hydroxide and soap forming acid occurs during emulsification. If desired, all of the ingredients that are to be emulsified may be charged to a single vessel under constant agitation and the blend may then be continuously fed to an emulsifying apparatus. Alternatively, water, solution of emulsifying agent and elastomer solution (cement) may be fed by separate inlets into the emulsifying apparatus in the desired proportions and the resulting aqueous emulsion recovered and stored for subsequent processing.

The proportion of emulsifying agent is adjusted for the purpose of forming a relatively stable emulsion under the conditions and time period required for latex formation and moreover must be adjusted to the point where transfer of the rubber from its organic solvent solution into colloidal suspension in the aqueous phase may be easily accomplished. Emulsions that are not stable are characterized by two layers and will result in latices of uneven quality, with large globules of undispersed cement distributed more or less irregularly throughout the latex.

As previously indicated, the aqueous emulsion of the synthetic polymer should be sufficiently stable in order to produce a desirable latex. Emulsions which are not stable are characterized by at least partial separation of the emulsion into two layers. The stability of the emulsion depends largely upon the average particle size of the polymer phase and this size is most simply controlled by adjusting the concentration and type of emulsifier in the aqueous phase in relation to the polymer-solvent phase. The particle size also may be decreased by reducing the throughput rate through the emulsification apparatus and/or increasing the degree of external recycle around the homogenizing apparatus. These measures may be undertaken alone or in combination of varying the amount of emulsifying agent and the concentration of the polymer solution. The resulting product from the emulsification step should contain in the order of 3–15% by weight of solids depending on the amount of water used, the amount in the order of 5–10% being preferred for reasons of overall efficiency, economy and optimum technical properties.

*Foaming operation*

The emulsion so formed is then in condition for the preparation of foam in accordance with the present invention. The foaming operation is accomplished by one of two alternatives or combinations thereof: The solvent for the polymer (hereinafter referred as as the rubber) has a critically limited solubility in water of 0.5–5 cc. per liter at room temperature (20° C.). Preferably it has a water solubility of 0.6–2 cc./l. at 20° C. and has a boiling point or boiling points if a mixture, at least 65° C. lower than that of the boiling point of water under the same pressure conditions. The reason for this will become apparent during the description of the foaming operation.

Foaming is accomplished by either heating the emulsion sufficiently to vaporize at least a substantial proportion of the rubber solvent without vaporizing more than a minor proportion of water or, on the other hand, the foaming may be accomplished by preheating and reducing pressure until the same type of foaming is accomplished. It is to be emphasized that the foaming operation is carried out with the end result of vaporizing the rubber solvent without causing any substantial massive escape of the solvent from the foam. In other words, the foaming operation is no considered to be a fractional distillation or flashing in any sense. It is on the contrary, the creation of gaseous bubbles throughout the heated or depressurized emulsion sufficient to cause the formation of a foam resembling shaving cream or froth, thus constituting extremely intimate mixtures of vaporized solvents dispersed throughout the liquid phase comprising the aqueous dispersion of colloidal rubber particles and a colloidal solution of the emulsifying agent.

The successful operation of foaming is reflected in the fraction of solvent separated from the cement per pass through a foaming step and the lack of coagulation of the rubber during the operation. While a substantial differential in boiling point between the solvent and water is highly beneficial, the critically limited water solubility of the solvent is of even more importance. It is believed this is due to the relative ease of transfer of the solvent from the cement phase into the water phase. If the solvent is too low in water solubility, the ease with which the foaming operation can be economically carried out is correspondingly reduced.

The particular piece of apparatus utilized for accomplishing this step is not critical. This is best accomplished by employing heat exchanger tube bundle wherein the emulsion passes either inside or outside the tubes being heated by a heat exchange medium of any desired description. Another procedure involves the direct contacting of steam and emulsion in a suitable vessel wherein foam is created.

The heating should be accomplished however under conditions which will permit relatively uniform heat transfer throughout the foam as it is formed or shortly thereafter and prior to foam collapse. The reason for this is to effect uniformity of the entire product, so as to minimize the formation of zones throughout the product having variable amounts of solvent remaining therein.

In accordance with the present invention, the creation of a foam of substantially the entire body of the emulsion followed by collapse of the foam results in the separation of solvent phase and aqueous latex phase. The precise temperature at which each of these is to be accomplished will depend upon a number of factors readily determined such as the pressure, identity of solvent, efficiency of heat transfer apparatus, etc.

*Foam collapse*

Having created the foam for the purpose of separating the rubber solvent form colloidal rubber particles, the next stage in the process comprises collapsing the foam prior to separation of the phases. This may be accomplished either by increasing the pressure on the system sufficiently to liquify the solvent vapors or by cooling the foam to an extent sufficient to obtain this same result. Of course, combinations of these two alternatives may be utilized. As intimated, hereinabove, the foam collapse in preferably accomplished with a minimum of agitation, preferably by passage through a heat exchange bundles designed particularly for this purpose in having a relatively large number of tubes with relatively short lengths. Minimum turbulence is achieved when the foam passes through the shell of the exchanger, the cooling medium being sent through the tubes thereof. Cooling or pressure are designed to be sufficient for reducing the vaporized solvent to a liquid state but insufficient to solidify either the solvent or the aqueous phase. In other words, the foam collapse is accomplished under such conditions that the major phases comprise liquid solvent, liquid water, and collodial dispersions of emulsifying agents and of rubber particles. The purpose of mininum agitation during foam collapse is to minimize reincorporation of separated rubber solvent back into the aqueous phase.

*Solvent removal*

The collapsed foam mixture comprises a relatively intimate admixture of the two immiscible phases, namely, organic solvent and aqueous latex. Due to unavoidable agitation, there is usually an unresolved phase comprising an admixture of rubber, residual solvent and soap containing emulsifier, droplets of such complicated mixtures being intimately dispersed in a portion of the liquified solvent phase. This resembles a slime and is often difficult to resolve. It has been found, however that resolution is readily accomplished if the entire collapsed foam mixture is passed through a coalescer packed with a fibrous material such as steel wool, steel filings, York matting, glass wool or the like. Coalescence for the resolution of any slime phase may be accomplished at this point or after the solvent removal step now to be described.

The mixture is then sent to a settler or decanter wherein the liquidified solvent forms a separate phase from the aqueous latex. It is then a simple matter to decant or otherwise remove the solvent phase from the latex phase. The interface between these two phases will contain any "slime" as described above if coalescense has not been performed or has been incomplete. Thus, coalescense can take place there prior to decanting as described above or may be accomplished by passing the separated solvent phase together with slime through the same type of coalescer. Of course, the passage through a coalescer may be accomplished at both points if desired and if operation is found to be more efficient by this means.

*Residual solvent removal*

The latex recovered from the solvent separation step normally comprises a major proportion of water containing substantial amounts of emulsifying agent and a colloidally dispersed minor proportion of the hydrocarbon polymer (rubber). Furthermore, there usually will be present a minor residual amount of the solvent which was not removed from the system by the steps previously described. While it is highly desirable to remove this residual solvent, it may at this particular point serve a useful purpose in the optional concentration of the latex. Since the specific gravity of the organic solvents are substantially less than that of water. Therefore, the combination of rubber with residual solvent constitutes a phase of lower specific gravity than that of water. It is possible to efficiently centrifuge the latex to remove a substantial portion of the aqueous soap phase and recover a concentrated latex. This is desirable with respect to the efficiently of the steps to be described hereinafter since a large proportion of the aqueous emulsifier phase must or should be removed at some later stage in the latex forming process and moreover may improve the efficiency of residual solvent removal now to the accomplished.

While residual solvent may be removed by flashing techniques, it is preferable to repeat foam formation and foam collapse followed by decanting of the resulting separate phases. The conditions for foam removal and collapse are substantially those described hereinbefore for the initial utilization of these two processing steps. Likewise, the coalescence and removal aspects (decanting) are essentially those previously described.

Latex concentration

The latex derived as described above now comprises an excessively large aqueous emulsifier phase having polymer particles colloidally dispersed therein either with or without minor residual portions of solvent. A second decanting step may be accomplished after heating the latex sufficiently to promote further phase separation of any residual solvent, although this step is not essential. The latex can be concentrated by passing it through a centrifuge whereby a major proportion of the aqueous emulsifier phase is removed and separated from a concentrated latex phase which now may contain upwards of 50% by weight of colloidally dispersed hydrocarbon polymer (rubber) together with the remaining portion of the aqueous emulsifier phase. The conditions of centrifuging are controlled to accomplish the degree of separation desired and will depend in part upon the precise concentration of the several components referred to here as well as the toleration of the emulsification agent in the final latex end use. Still further solvent removal may be accomplished by passing the concentrated latex through flashing drums or strippers and optionally the latex may be subjected to a second or further centrifuging operation or operations to remove still further portions of the aqueous emulsifier phase referred to as "serum."

Concentrated latex

The solids content of the latex is of considerable importance when the latex is to be used for the preparation of dipped goods and vulcanized foam. When the latex is to be employed as an intermediate for the recovery of rubber by coagulation, the solids content and content of emulsifying agent are of decreasing importance. The required solids content of the concentrated latex will vary depending on such factors as the elastomer species, the species of the emulsifying agents and the ultimate utility. Generally, the solids content of the latex should be in excess of 50% by weight, preferably 55-75% by weight being specifically determined in each case. For cis 1,4-polyisoprene latex, it is most preferred that the solids content be in excess of about 60% and generally between 65 and 70%; for cis 1,4-polybutadiene, the solids content may be considerably less and still be acceptable, but in no case should the solids content be below about 50% by weight, when the latex is to be used for the preparation of vulcanized foams or dipped goods.

The process of the invention will be described with particular reference to the figure: A cis 1,4-polyisoprene cement containing 10% by weight of polyisoprene, the solvent being mixed amylenes, is taken from a source 1 through line 2 to a blend and surge tank 3 wherein it is mixed with an approximately equal amount of water containing 1.5% by weight (basis water) of potassium rosinate, from a source 4 via line 5. The mixture from the blend tank 3 is then passed by means of line 6 and eductor 7 to an emulsification device 8 which is operated at an exit temperature of about 135° F. The emulsion is recycled by means of lines 9 and 10 to ensure maximum dispersal in the emulsification device. Preferably, the emulsified mixture is then passed to the holding tank 11 wherein a recycle of about 1-5% of the emulsified material is passed back into line 10. This proportion is recycled so as to insure complete emulsification of any minor amount of the emulsification mixture not previously fully emulsified.

The finished emulsion is then passed by means of line 12 to the heat exchange bundle 13 comprising the foam forming unit which is operated at about 170-200° F. under 15 p.s.i.g. In this unit, the material which exits comprises a foam of shaving cream consistency which is passed to the time tank 14 for a residence period usually less than about 1 minute in order to enable the solvent to reach its equilibrium concentration relative to the polymer throughout the foam. The product then proceeds to the foam condenser 15 wherein the foam is chilled to about less than 110° F. at 10 p.s.i.g., thus causing a collapse of the foam due to condensation of the vaporized solvent to a liquid state. The condensed foam passes by means of line 16 through coalescer 17 which is packed with steel wool for the purpose of further resolving the separate phases of solvent and latex.

The coalesced and condensed material then passes by means of line 18 to a decanter 19 wherein it is stored for a sufficient time at about 110° F. and 10 p.s.i.g. to cause a substantial settling of the phases, the solvent rising to the top and being removed by means of line 20. The lower layer, comprising a concentrated emulsion comprising largely a latex with minor proportions of residual solvent is optionally passed by means of line 21 to centrifuge 22. Any serum, comprising water and emulsifying agent, removed thereby may be recycled by a line (not shown) to the emulsification zone of the process.

The concentrated mixture now contains a minor but substantial amount of residual solvent which is preferably removed by subjecting it to foam formation and collapse as hereinbefore described, in units 23, 24, and 25 comprising the foam former 23, time tank 24 and foam condenser 25 and thereafter passed through a set of apparatus comprising the coalescer 26 and decanter 27. The purposes and results of each of these units are substantially identical with the corresponding pieces of apparatus described hereinbefore.

The bottom layer from the decanter 27, after removal of the top layer solvent, comprises a latex containing a reduced but still substantial amount of solvent which is preferably removed at least in part by passage through a heater 28 to raise the temperature to about 180° F., the heated latex being then sent to a settler 29 for further removal of solvent which separates. The dilute latex is now sent by means of line 29A to a centrifuge 30 for still further removal of serum (water and emulsifying agent) which is recycled by means of line 31 to the serum tank 4.

The concentrated latex still contains traces of solvent which are removed by sending the concentrate by means of line 32 to flashing zone 33, the final product then being a concentrated latex containing less than about 1% solvent based on the rubber and the product comprising about 65% colloidally dispersed rubber with 35% water containing about 0.35% by weight of potassium rosinate based on the water phase.

I claim as my invention:

1. In the process for the production of a $C_{4-5}$ conjugated diene hydrocarbon polymer latex, wherein 100 parts by volume of a cement comprising 5-30% by weight of a polymer dissolved in a volatile hydrocarbon solvent having a solubility of 0.5-5 cc./liter of water at 20° C. and boiling at least 65° C. below the boiling point of water is emulsified with 40-300 parts of water containing 0.5-2% by weight of an alkali metal soap of a monocarboxylic acid having at least 12 carbon atoms per molecule as an emulsifying agent and solvent is removed, leaving a latex comprising the polymer colloidally dispersed in water, the steps comprising:

(a) heating the emulsion sufficiently to vaporize the solvent in the emulsion to form a foam of substantially all of the emulsion components in the absence of massive solvent escape, said foam comprising vaporized organic solvent, liquid water, colloidally dispersed polymer, and emulsifying agent;
(b) reducing the vaporized organic solvent to liquid state by cooling whereby the foam is collapsed;
(c) phase separating the collapsed foam, whereby a major proportion of organic solvent containing no more than a minor residual amount of its original polymer content is decanted from the aqueous latex phase, said aqueous phase comprising a colloidal solution of the emulsifying agent and a colloidal dispersion of the polymer.

2. A process according to claim 1 wherein the rubber is polyisoprene.

3. The process for the production of rubber latex comprising:
(a) forming a rubber cement comprising 5–20% by weight polyisoprene in a hydrocarbon solvent, said solvent having a water solubility of 0.6–2 cc./liter of water at 20° C., at boiling point at least 65° below that of water;
(b) emulsifying 100 parts by volume of the cement with 40–30 parts of water containing 0.5–2% by weight of an alkali metal soap of a monocarboxylic acid having at least 12 carbon atoms per molecule;
(c) heating the emulsion in a confined spaced sufficiently to vaporize hydrocarbon solvent and at a temperature below the boiling point of water, whereby a foam is formed, substantially all of the solvent forming the vapor phase of the foam in the absence of massive vapor escape, the rubber being colloidally dispersed in the liquid aqueous soap containing phase of the foam;
(d) cooling the foam sufficiently to liquify the hydrocarbon solvent and thereby collapse the foam;
(e) and decanting the liquid hydrocarbon containing no more than a minor residual amount of its original rubber content from a latex comprising water having rubber colloidally dispersed therein.

References Cited by the Examiner

UNITED STATES PATENTS

| | | | |
|---|---|---|---|
| 2,776,295 | 1/1957 | Wicklatz et al. | 260—29.7 |
| 2,799,662 | 7/1957 | Ernst et al. | 260—29.7 |
| 2,947,715 | 8/1960 | Charlet et al. | 260—29.7 |
| 3,003,930 | 10/1961 | Pugh et al. | 202—46 |

MURRAY TILLMAN, *Primary Examiner.*

LOUISE P. QUAST, *Examiner.*

J. ZIEGLER, *Assistant Examiner.*